United States Patent [19]

Mackin

[11] Patent Number: 5,255,010
[45] Date of Patent: Oct. 19, 1993

[54] ELECTRONIC CIRCUIT FOR SUPPLYING SELECTED IMAGE SIGNALS TO A THERMAL PRINTER

[75] Inventor: Thomas A. Mackin, Hamlin, N.Y.

[73] Assignee: Eastman Kodak Company, Rochester, N.Y.

[21] Appl. No.: 749,030

[22] Filed: Aug. 23, 1991

[51] Int. Cl.$^5$ .............................................. G01D 15/10
[52] U.S. Cl. .................................... 346/76 L; 346/108
[58] Field of Search ................... 346/33 R, 154, 107 R, 346/108, 76 L, 76 PH; 358/302, 298, 75

[56] References Cited

U.S. PATENT DOCUMENTS

| 4,386,374 | 5/1983 | Kimoto | 346/108 X |
| 4,476,542 | 10/1984 | Crean et al. | 346/76 L X |
| 4,587,396 | 5/1986 | Rubin | 346/76 L X |
| 4,620,288 | 10/1986 | Welmers | 346/108 X |
| 4,804,976 | 2/1989 | Ohmori et al. | 346/76 PH |
| 5,065,445 | 11/1991 | Kuwabara et al. | 346/108 X |
| 5,103,316 | 4/1992 | Ogura | 346/107 R X |

Primary Examiner—A. T. Grimley
Assistant Examiner—William J. Royer
Attorney, Agent, or Firm—Robert L. Randall

[57] ABSTRACT

There is described a simple and inexpensive circuit for a thermal printing system which provides various test and diagnostic image patterns. The circuit includes a dual-port RAM, an address counter, a handshake logic unit and a multiplex switch unit. The image patterns provided by this circuit, which are applied to the printing system at high speed and in real time (e.g., 10 m bits/-sec.), visually verify the precise mechanical and electrical adjustment, normal operating performance, and the high quality print output of the overall printing system. Various test images are easily programmed off-line into this electronic circuit. This circuit, with its printed test images, provides a highly useful tool in the initial set-up and the subsequent maintaining of the operation of the printing system.

10 Claims, 2 Drawing Sheets

ELECTRONIC CIRCUIT FOR SUPPLYING SELECTED IMAGE SIGNALS TO A THERMAL PRINTER

FIELD OF THE INVENTION

This invention relates to an electronic circuit for a thermal printer employing multiple lasers to print finely detailed images, and more particularly, to a simple and effective electronic circuit for supplying test and diagnostic image data to a thermal printer such that the printer is easily adjusted to print images of the highest quality.

BACKGROUND OF THE INVENTION

One type of thermal printer employs a dye-donor element placed over a dye-receiver element. The two elements together are moved past a print head having a plurality of very small heat "sources". When a particular heating source is energized, thermal energy from it causes a small dot or pixel of dye to transfer from the dye donor element onto the receiver element. The density of each dye pixel is a function of the amount of energy delivered from the respective heating source of the print head to the dye donor element. The individual pixels are printed in accordance with image data; all of the dye pixels thus formed together define the image printed on the receiver element.

Because light from a laser can be focused to an ultra-fine, intense spot of heat energy and can be modulated at very high speed, lasers (such as small, relatively inexpensive diode lasers), are now the preferred heating sources for printing the dye pixels in the more advanced thermal printers. But in the case where pixels are printed at very fine pitch on very closely spaced lines (e.g., 1800 lines per inch and 1800 pixels per inch), it becomes impracticable to provide an individual laser for each line across the width of a page being printed. For example, a 10 inch wide page would require 18,000 lasers and respective drive circuits. On the other hand, using only one laser and scanning in sequence the lines across a page to print an image is a very much slower operation than when multiple lasers are used.

In U.S. patent application Ser. No. 451,655 filed Dec. 18, 1989, now U.S. Pat. No. 5,164,742, entitled "Thermal Printer", and assigned to an assignee in common with the present patent application, there is disclosed a thermal printer employing a plurality of lasers for printing a like plurality of lines of print pixels at the same time. This thermal printer produces full color pictures printed by thermal dye transfer in accordance with electronic image data corresponding to the pixels of a master image. The pictures so produced have ultra-fine detail and faithful color rendition which rival, and in some instances exceed in visual quality, large photographic prints made by state-of-the-art photography. This thermal printer is able to produce either continuous-tone or half-tone prints. In the continuous tone mode, the ultra-fine printed pixels of colored dye have densities which vary over a continuous tone scale in accordance with the image data. On the other hand in the half-tone mode, the ultra-fine print pixels which define the picture are formed by more or fewer micro-pixels of dye such that the pixels printed closely together appear to the eye as having greater or lesser density and thus simulate a continuous tone scale. Half-tone, offset printing is widely used for example, in printing and publishing. It is common practice in this and related industries first to obtain and visually inspect "proof" prints prior to production so that any visual blemishes, artifacts of the half-tone process, or other undesirable qualities in the "printed" pictures, (which would otherwise occur in production) can be corrected before production begins. In the past, the obtaining of these "proof" prints has involved considerable time delay and significant extra expense. This thermal printer, by virtue of its unique design and mode of operation is able to produce quickly (within minutes) an authentic half-tone printed image which (for all intents and purposes) is visually indistinguishable from the highest quality color image made by offset printing. And by comparison, the initial setup costs and processing times for the printing plates required in high quality offset printing are man times (e.g., hundreds) the costs and times required by this thermal printer to produce "proof" prints of equal quality. This not only simplifies the publishing operation prior to production, but helps a publisher improve the visual quality of the end product (e.g., an illustrated magazine).

The human eye is extremely sensitive to differences in tone scale, to apparent graininess, to color balance and registration, and to various other incidental defects (termed printing artifacts) in a picture which may occur as a result of the process by which the picture is reproduced. Thus it is highly desirable for a thermal printer such as described above, when used in critical applications, to be as free as possible from such printing artifacts.

The thermal printer described in the above-mentioned U.S. Patent Application has a rotating drum on which can be mounted a print receiving element with a dye donor element held closely on top of it. The two elements are in the form of thin flexible rectangular sheets of material mounted around the circumference of the drum. As the drum rotates, a thermal print head, with individual channels of laser light beams in closely spaced, ultra-fine light spots focused on the dye element, is moved in a lateral direction parallel to the axis of the drum. With each rotation of the drum, multiple lines (termed a "swath") of micro-pixels are printed on the receiving element in accordance with image data applied to the electronic driving circuits of the respective laser channels. There are as many image lines in a swath as there are laser channels (for example, 18 lines with a lateral spacing of 1800 lines per inch) and there are as many swaths as required to print an image of a given page width. It has been found that even minute differences in the drive power applied to the individual lasers can cause objectionable visual differences in the densities of the micro-pixels printed by the individual laser channels where supposedly equal densities are called for by the image data. Power differences as seemingly unimportant as a small fraction of one percent of a desired laser drive power level are visually noticeable as density variation of the printed pixels. It is therefore highly desirable to be able quickly and easily to make a visual check to show that all of the laser channels are printing uniformly and with proper timing.

The multiple swaths printed by the thermal printer disclosed in the above-identified U.S. Patent Application must be precisely registered side-by-side relative to each other and the individual print lines of a swath must be precisely aligned in time relation relative to each other. Even very slight (e.g., a few microns) mis-registration or mis-alignment causes degradation in the visual quality of a printed image. The print head of this thermal printer is provided with micrometer adjustment of the angular position of the print head and hence of the pitch of the image lines printed within a swath (see FIGS. 2 and 3 of the above-identified U.S. Patent Application). Thus it is possible to mechanically adjust the head to obtain accurate print registration from swath to swath. However, because the adjustments have to be precisely made, it is advantageous to be able to print a visual test image which immediately verifies proper swath registration and alignment of the printed lines.

The thermal printer described above has associated with it various electronic circuits. These circuits include a data interface module (DIM) and a plurality of drive circuits, supplied with line data by the DIM, for driving a like plurality of laser channels of the print head. The DIM receives image data from a raster image processor (RIP) which converts continuous-tone image data at high speed from a computerized editing and proofing station (CEPS) and converts the data on-the-fly to half-tone bit image data, which it supplies to the DIM. Due to the large size of the data files (e.g., 200 megabytes) and the high speed at which the RIP supplies data (e.g., 10 megabits/sec.) to the DIM, software management of the RIP to generate suitable image data for testing and adjusting the printer is cumbersome and expensive. The present invention provides a simple and highly effective solution to this problem of testing and adjusting, cost, etc.

SUMMARY OF THE INVENTION

In accordance with the invention an auxiliary electronic circuit (circuitry) is provided which supplies, in real time, high speed test and diagnostic image data to a thermal printer. The printer is operated or driven in normal fashion and is supplied with image data synthesized by this electronic circuit [termed a pseudo-RIP (p-RIP)], instead of data from a conventional RIP itself. The image data provided by the p-RIP enables the printer to print selected test patterns which immediately show whether the printer is correctly adjusted, and whether its electronic circuits and laser channels are properly receiving and printing the image data. The p-RIP is thus a powerful and time-saving device for initially setting the operating adjustments (both mechanical and electrical) of the printer, and also for thereafter verifying that the adjustments remain optimum.

In a preferred embodiment of the invention, the p-RIP circuit comprises memory means for storing relatively small numbers of bits of image data; data means for supplying selected bit data to the memory means; and means for repetitively at high speed outputting the selected image data stored in the memory means to the electronic data and drive circuits of the printer.

Viewed from another aspect, the present invention is directed to a thermal printer system. The thermal printer system comprises a computerized editing and proofing station (CEPS), a raster image processor (RIP) connected to receive signals and data from the CEPS and to supply RIP data, a thermal printer unit having associated electronic circuits, a controlling processor unit (CPU), MUX means, and a pseudo-RIP circuit. The MUX means, which has two data inputs and a data output, the output being connected to an input of the electronic circuits of the printer unit, one input of the MUX means being connected to receive RIP data, switches the data on one or the other of its inputs to its output and applies the output data to the thermal printer. The pseudo-RIP circuit comprises random access memory (RAM) means for storing bit data and for outputting the stored data to the other input of the MUX means, address counter means for actuating the RAM means, connection means for applying selected serial bit data from the CPU to an input of the RAM means and for applying address instructions from the CPU to the RAM means and to the address counter means, the address counter means operating by address instructions from the CPU sequencing at high speed through the bit data stored in the RAM means, the RAM means outputting its data as pseudo-RIP data to the other input of the MUX means, such that the thermal printer unit prints the pseudo-RIP data in real time and alternatively prints the RIP data in real time.

A better understanding of the invention, together with its important advantages will best be gained from a study of the following description given in conjunction with the accompanying drawings and claims.

DETAILED DESCRIPTION

Figure 1:
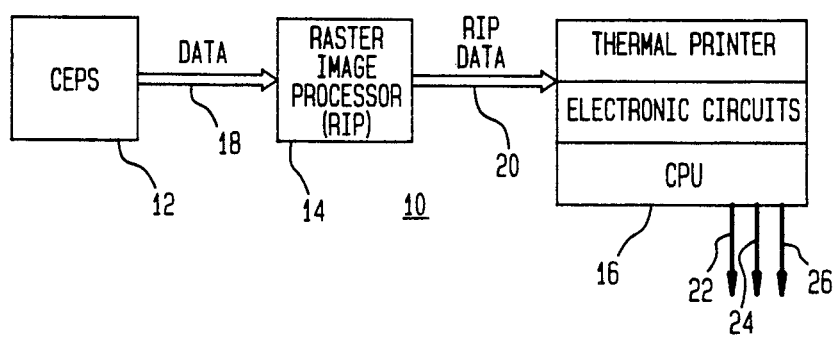
FIG. 1 is a schematic block diagram of a thermal printer system in which the invention has utility.

Referring now to FIG. 1 there is shown in schematic block form a thermal printer system 10 in which the invention has utility. The system 10 comprises a computerized editing and proofing station (CEPS) 12, a raster image processor (RIP) 14, and a thermal printer unit 16 which incorporates both the printer itself (not shown separately) its associated electronic circuits, and a controlling processor unit (CPU). High speed continuous-tone data is supplied from the CEPS 12 via a data buss 18 to the RIP 14 where it is processed on-the-fly at high speed into half-tone bit data (termed RIP data). The RIP data are applied via a RIP buss 20 to a data interface module (DIM), not shown here but to be described shortly, and which is the front-end portion of the electronic circuits in the printer unit 16. The DIM provides line image data to the respective drive circuits of the multiple laser channels of the printer. The CPU of the printer unit 16 downloads initializing parameters to the printer's electronic circuitry. The CPU also supplies selected signals and data to the circuit shown in FIG. 2, via respective output leads 22, 24, and 26.

Figure 2:
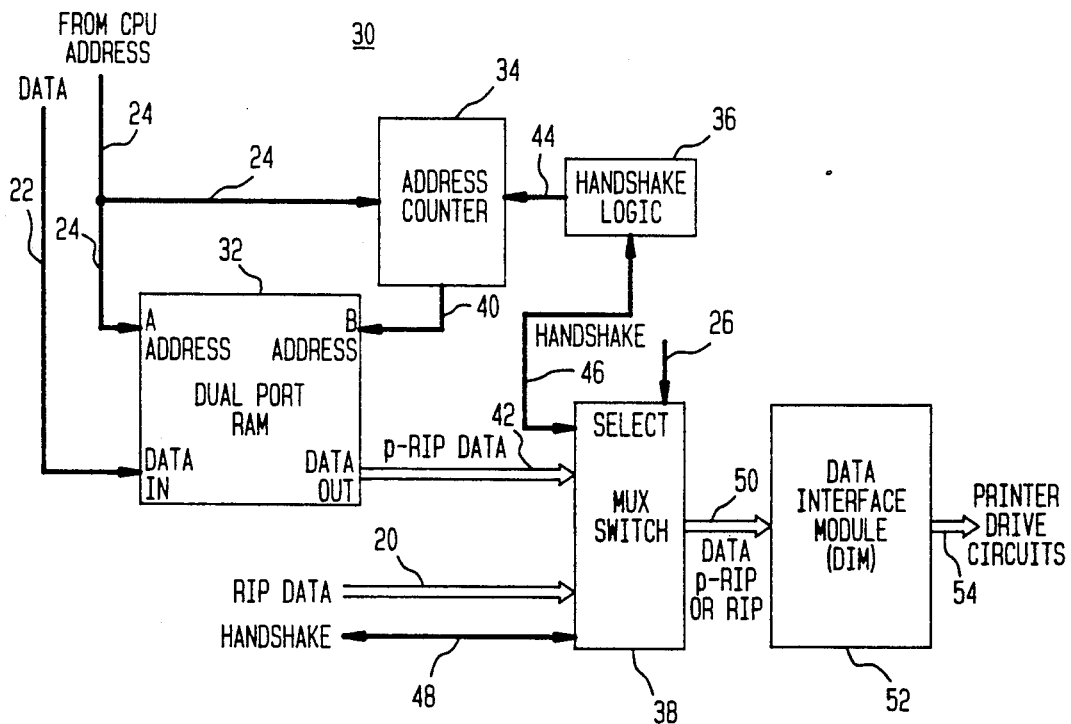
FIG. 2 is a block diagram of an electronic circuit provided according to a preferred embodiment of the invention.

Referring now to FIG. 2, there is shown in block form an electronic pseudo-RIP (p-RIP) circuit (circuitry) 30 for supplying p-RIP image data to the electronic circuits of the thermal printer unit 16 (FIG. 1). The p-RIP circuit 30 comprises a dual-port, random access memory (RAM) device 32, an address counter 34, a handshake logic unit 36, and a multiplex (MUX) switch unit 38. The RAM device 32 has selected bit data applied to its data input by the lead 22 from the CPU of the printer unit 16 (see also FIG. 1). Address values from the CPU of the printer unit 16 are applied via the lead 24 to an "A" address input of the RAM device 32 and to the address counter 34. The address counter 34 in turn applies count signals via a lead 40 to a "B" address input of the RAM device 32. On instructions from the address counter 34, the RAM device 32 outputs, at an output data out, high speed p-RIP data via a buss 42 to a p-RIP data input of the MUX switch unit 38. The MUX switch unit 38 also receives at another input high speed RIP data via the buss 20 from the RIP unit 14 (see FIG. 1). The handshake logic unit 36 is connected via a lead 44 to an input of the address counter 34 and via a lead 46 to another input of the MUX switch unit 38. On signal from the handshake logic unit 36, the address counter 34 starts to run and the P-RIP data input of the MUX switch unit 38 is switched to receive the p-RIP data via the buss 42 from the RAM device 32. The switching of the MUX switch 38 from one input to the other (buss 20 or 42) is controlled by a "select" signal applied to it via the lead 26 from the CPU of the printer unit 16. A handshake signal from the logic unit (not shown) of the RIP 14 is applied to the MUX switch 38 via a lead 48. The address counter 34 gets an address value (data word) loaded into it from the CPU via the lead 24 that is indicative of the number of bits in the pattern stored in the RAM 32. The counter 34 increments, pointing to a new bit in memory in the RAM 32, every time a high speed handshake cycle of the handshake logic unit 36 is performed. This continues until the count of the counter 34 reaches the loaded address value, whereupon the counter 34 resets itself and points to the first bit in the RAM 32, and so on. This is the way a repetitive pattern (p-RIP data) is reproduced at high speed using only small numbers of bits of data in the RAM 32. The MUX switch unit 38 applies its input data, either the p-RIP data received via the buss 42, or the RIP data received via the buss 20, to an output buss 50 which is coupled to a data interface module (DIM) 52. As mentioned above, the DIM 52 is a front-end portion of the electronic circuits of the thermal printer unit 16 (FIG. 1). The DIM 52 applies via a buss 54 image data to be printed line-by-line to each of the drive circuits of the respective laser channels of the printer (not shown).

The RAM device 32 may initially be loaded address-by-address, with selected bit data supplied via the lead 22 at slow speed from the CPU of the printer unit 16. The bit addresses from the CPU are loaded into the address input A of the RAM device 32 and into the address counter 34 via the lead 24. Once loaded with data, the RAM device 32 may be operated at high speed by the address counter 34. Signals from the address counter 34 (after a "handshake" protocol) are applied via the lead 40 to the address input B of the RAM device 32, and sequence through all of the addresses where data bits are stored in the RAM device 32. Then the address signals from the counter 34 repeat the sequence of addresses, and so on, cycle after cycle, to print swath after swath. The high speed repetitive sequencing of the bit data stored in the RAM device 32 is outputted as p-RIP data via the buss 42 to an input of the MUX switch unit 38, as explained previously.

Figure 3:
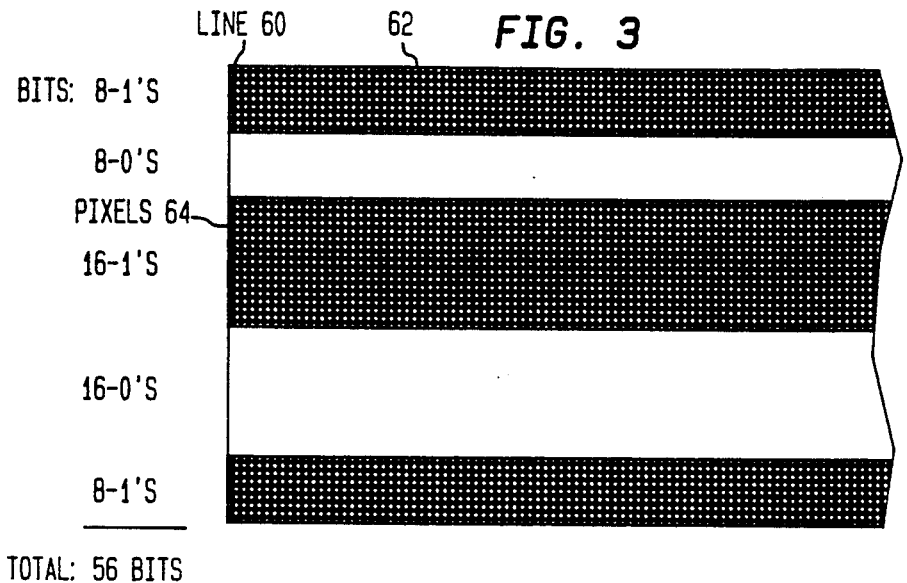
FIG. 3 is a printed image of on selected test pattern provided by the circuit of FIG. 2.

Referring now to FIG. 3, there is shown here greatly enlarged, not to scale, and partially broken away an actual image (shown within the limitations of reproduction by this patent drawing) as would be printed by the thermal printer unit 16 in accordance with selected p-RIP data. The RAM device 34 was initially loaded with bit data comprising 8 "1's", 8 "0's", 16 "1's", 16 "0's", and 8 "1's" for a total of 56 bits. The pattern printed is as shown in FIG. 3 with the corresponding bit count being shown on the left. Thus, in a first vertical line of print 60 starting at a top edge 62, the first 8 "1's" print "8" micro-pixels 64 (each pixel is actually only about 20 microns diameter), the next 8 bits, which are "0's" print nothing, the next 16 "1's" print 16 vertically spaced pixels 64, the next 16 "0's" print nothing, and the last 8 "1's" print 8 pixels 64. Each vertical line 60 of pixels is printed by a respective laser channel of the printer and all of the channels of the print head print the lines of a swath during a given time. Then the next "swath" is printed across the width of the image, and so on. By way of example, the pixels 64 may be printed on a pitch of 1800 per inch (vertical) and the lines 60 may be spaced at 1800 per inch (horizontal). Thus, with the various laser channels adjusted to print with uniform density, and with timing and registration properly adjusted, the visual light and dark bar pattern shown in FIG. 3 is very even, straight and uniform in density. This pattern also shows that the electronic circuits of the printer (e.g., the DIM 52 and other circuits) are properly receiving image data (the p-RIP data which, as data, is treated in the same way as the RIP data) and then applying the data line-by-line with proper timing to the drive circuits of the respective laser channels.

Figure 4:
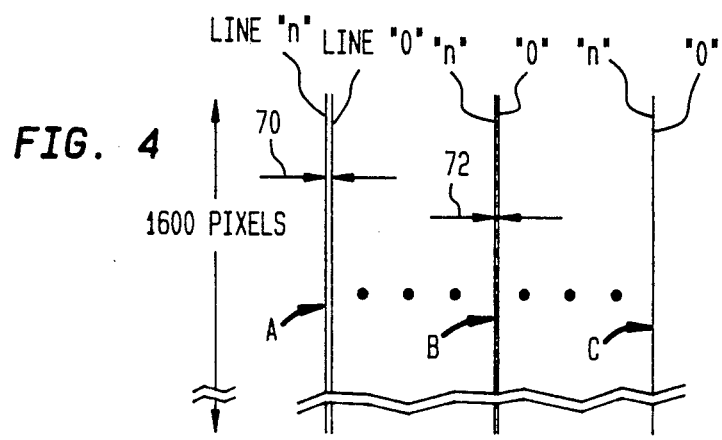
FIG. 4 is a printed image of another selected test pattern.

Referring now to FIG. 4, there is shown greatly enlarged, not to scale, and partially broken away a printed image showing both proper and improper alignment of selected print lines from one swath to the next. In the thermal printer described in the above identified U.S. Patent Application, in addition to the image-printing laser channels of the print head which print a swath, there are provided two "dummy" laser channels. These dummy laser channels serve to eliminate visually objectionable "seam lines" (printer artifacts) between successive swaths of an image being printed. One dummy laser channel is placed on an outer side of the first ("1st") of the image-printing laser channels and the other dummy laser channel is placed on an outer side of the last ("n"th) image printing laser channel. For a complete description of this use of dummy laser channels, the reader is referred to the above-mentioned U.S. Patent Application. For the sake of illustration here, the first dummy laser channel is designated the "0" dummy laser channel, the image-printing laser channels are designated "1" through "n", and the second dummy laser channel is designated "n+1". The image lines "1" through "n" (printed by their respective laser channels) comprise a "swath". With each swath there is also a dummy line "0" next to the image line "1" and a dummy line "n+1" next to the "n"th image line. When the swaths are printed side-by-side in succession across the width of an image the dummy line "0" of a given swath is printed precisely over the image line "n" of the preceding swath, and image line "1" of the given swath printed over the dummy line "n+1" of the preceding swath. This arrangement serves to eliminate visually objectionable "seam lines" between the swaths. By way of example, there may be 18 image printing laser channels and 2 dummy laser channels (for a total of 20) in a print head.

As was explained above, a dummy line "0" for example, must be precisely registered with an image line "n". A condition where the lines "0" and "n" are not properly registered is shown at "A" in FIG. 4. The RAM device 32 has been programmed with 1600 "1's" for each of laser channels "0" and "n" which in turn print 1600 pixels respectively. The RAM device 32 has also been programmed with 1600 "0's" for each of the other laser channels so that they print "zeroes" (no printing). Accordingly, in FIG. 4 only the lines "0" and "n" are printed and each line is 1600 micropixels long. Because of the scale of FIG. 4, the micropixels are shown as forming the thin continuous lines "0" and "n" which are also shown broken away along their length. In the illustration at "A", the lines "0" and "n" are shown as being separated by a small distance indicated by the horizontal arrows 70. If the print head is adjusted (as explained above) in the proper angular direction, then at "B", the separation between the lines "0" and "n" is reduced to a smaller distance indicated by the horizontal arrows 72. Finally, with the print head exactly adjusted, the lines "0" and "n" lie on top of each other as illustrated at "C" in FIG. 4. Thus highly precise side-by-side registration (within a few microns) of the swaths is effected and verified.

Figure 5:
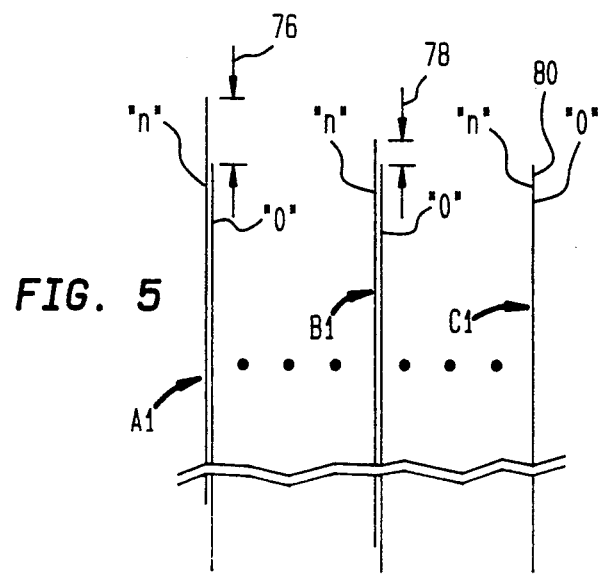
FIG. 5 is a printed image of yet another selected test pattern.

Referring now to FIG. 5, there is schematically shown, not to scale, a mis-alignment of the lines "0" and "n" due to timing errors in the electronic circuits. As indicated at "A1" the mis-alignment is a small distance indicated by the vertical arrows 76. After some adjustment is made the mis-alignment may be a smaller distance indicated at "B1" by the vertical arrows 78. When precisely adjusted, the lines "0" and "n" begin printing together as indicated at "C1" at a common starting point 80. The lines "0" and "n" are now both precisely aligned and registered. This verifies that the side-by-side swaths of the images which are subsequently printed during the regular operation of the printer unit 16 under control of the RIP 14, are properly aligned and registered.

It will now be appreciated that the p-RIP circuit 30 is highly effective in enabling precise adjustments to be made in the thermal printer unit 16. Mis-adjustments and defects of various kinds can readily be identified by a visual check of selected printed image patterns. Various test patterns are easily programmed into the p-RIP circuit 30 to provide diagnostic check-out and initial set-up of the printer unit 16 without cumbersome or expensive programming or modifications to the RIP 14. The RAM device 32 need only have a relatively very small memory capacity (e.g., 4K bytes) and it may be programmed at slow speed (e.g., off-line) by the CPU OF THE PRINTER UNIT 16. The elements comprising the p-RIP 30 are far less costly than the RIP 14 itself.

It is to be understood that the embodiment of an electrical circuit as used in a thermal printer described herein is illustrative of the general principles of the invention. Modifications may readily be devised by those skilled in the art without departing from the spirit and scope of the invention. For example, the RAM device 32 is not limited to a particular memory capacity, and selected data patterns other than those illustrated may be programmed into the device.

What is claimed is:

1. A thermal printer system comprising:
   a controlling processor unit (CPU);
   a raster image processor (RIP) connected to receive signals and data from the CPU and to supply RIP data;
   a thermal printer unit having associated electronic circuits;
   MUX means, which has two data inputs and a data output, the output being connected to an input of the electronic circuits of the printer unit, one input of the MUX means being connected to receive RIP data, for switching the data on one or the other of its inputs to its output and applying the output data to the thermal printer; and
   a pseudo-RIP circuit comprising random access memory (RAM) means for storing bit data and for outputting the stored data tot h other input of the MUX means, address counter means for actuating the RAM means, connection means for applying selected serial bit data from the CPU to an input of the RAM means and for applying address instructions from the CPU to the RAM means and to the address counter means, the address counter means operating by address instructions from the CPU sequencing at high speed through the bit data stored in the RAM means, the RAM means outputting its data as pseudo-RIP data to the other input of the MUX means, such that the thermal printer unit prints the pseudo-RIP data in real time and alternatively prints the RIP data in real time.

2. The thermal printer system of claim 1 wherein the pseudo-RIP circuit further includes handshake logic means which selectively actuates the MUX switch means to send pseudo-RIP data to the input of the electronic circuits of the thermal printer.

3. The thermal printer system of claim 1 wherein the RAM means is a dual-port RAM device having a storage capacity of about 4 kilobytes, said RAM device being programmable by the CPU off-line at slow speed, the CPU storing in the RAM device selected bit data patterns to be printed as test image's the RAM device being actuated by the address counter means to output its bit data at high speed to the MUX switch means.

4. The thermal printer system of claim 3 wherein the thermal printer unit has multiple laser channels for printing multiple lines of a swath of an image, the RAM device being loaded with multiple bits of data for printing in real time by the laser channel such that the printer unit prints selected image patterns of the pseudo-RIP data.

5. A thermal printer system comprising:
   a controlling processor unit (CPU);
   a raster image processor (RIP) connected to receive signals and data from the CPU and to supply RIP data;
   a thermal printer unit having multiple thermal printing channels for printing multiple lines of a swatch of an image and having electronic circuits for driving the respective channels;
   electronic switch means, which has two data inputs and a data output, the output being coupled to an input of the electronic circuits of the printer unit, one input of the electronic switch means being connected to receive RIP data, for switching the data on one or the other of its inputs to its output and applying the output data to the thermal printer unit; and
   a pseudo-RIP circuit comprising memory means for storing bit data and for outputting the stored data to the other input of the electronic switch means, address counter means for actuating the memory means, connection means for applying selected serial bit data from the CPU to an input of the memory means and for applying address instructions from the CPU to the memory means and to the address counter means, the address counter means operating by address instructions from the CPU sequencing at high speed through the bit data stored in the memory means, the memory means outputting its data as pseudo-RIP data to the other input of the electronic switch means, such that the thermal printer unit prints the pseudo-RIP data in real time.

6. The thermal printer system of claim 5 wherein the memory means is a dual-port random access memory (RAM) device, the RAM device being programmable by the CPU off-line at slow speed, the CPU storing in the RAM device selected bit data patterns to be printed as test images, the RAM device being actuated by the address counter means to output its bit data a high speed to the electronic switch means.

7. A thermal printer system which has adjustments for alignment and uniformity in printing, the printer system comprising:
 a thermal printer unit having multiple thermal printing channels which are adjustable for alignment and uniformity in printing and having associated electronic circuits;
 a controlling processor unit (CPU);
 a raster image processor (RIP) connected to receive signals and data from the CPU and to supply RIP data;
 MUX switch means, which has two data inputs and a data output, the output being connected to an input of the electronic circuits of the printer unit, one input of the MUX means being connected to receive RIP data, for switching the data on one or the other of its inputs to its output and applying the output data to the thermal printer unit; and
 a pseudo-RIP circuit for applying selected image data to the printer unit to print a test pattern showing alignment and uniformity in printing by the printing channels, the pseudo-RIP circuit comprising:
  random access memory (RAM) means for storing bit data and for outputting the stored data to the other input of the MUX switch means;
  address counter means for actuating the RAM means; and
  connection means for applying selected serial bit data from the CPU to an input of the RAM means and for applying address instructions from the CPU to the RAM means and to the address counter means, the address counter means operating by address instructions from the CPU sequencing at high speed through the bit data stored in the RAM means, the RAM means outputting its data as pseudo-RIP data to the other input of the MUX switch means, such that the thermal printer unit prints the RIP data in real time and alternatively prints the pseudo-RIP data in real time and the alignment and uniformity in printing of the printer unit are readily shown by the pseudo-RIP data.

8. The thermal printer system of claim 7 wherein the thermal printer unit has multiple laser channels for printing multiple lines of a swath of an image, the RAM means being loaded with multiple bits of data for printing a test pattern in real time by the laser channels such that adjustments of the printer unit are visually verified by printing selected image patterns of the pseudo-RIP data.

9. The thermal printer of claim 8 wherein the RAM means has a memory capacity of about 4 kilobytes and is loaded with a number of one-bits, followed by a number of zero-bits, followed by a number of one-bits, and so on to produce a test pattern of dark and light bars printed by all of the printing channels across the swaths printed.

10. The thermal printer of claim 8 wherein the RAM means has a memory capacity of about 4 kilobytes and is loaded with about 1600 one-bits for printing by selected ones of the printing channels, and is loaded with zero-bits for the rest of the printing channels such that printing alignment of the printing channels is easily seen from the data printed.

* * * * *